Jan. 17, 1956   F. B. BURT   2,731,272
PHONOGRAPH APPARATUS
Filed Aug. 4, 1949   10 Sheets-Sheet 1

INVENTOR.
FARLOW B. BURT
BY Cecil J Arens
ATTORNEY

ARROWS SHOW TRAVEL OF TONE ARM OVER CAM WHEN PLAYING ALTERNATE SIDES

INVENTOR.
FARLOW B. BURT
BY Cecil J Arens
ATTORNEY

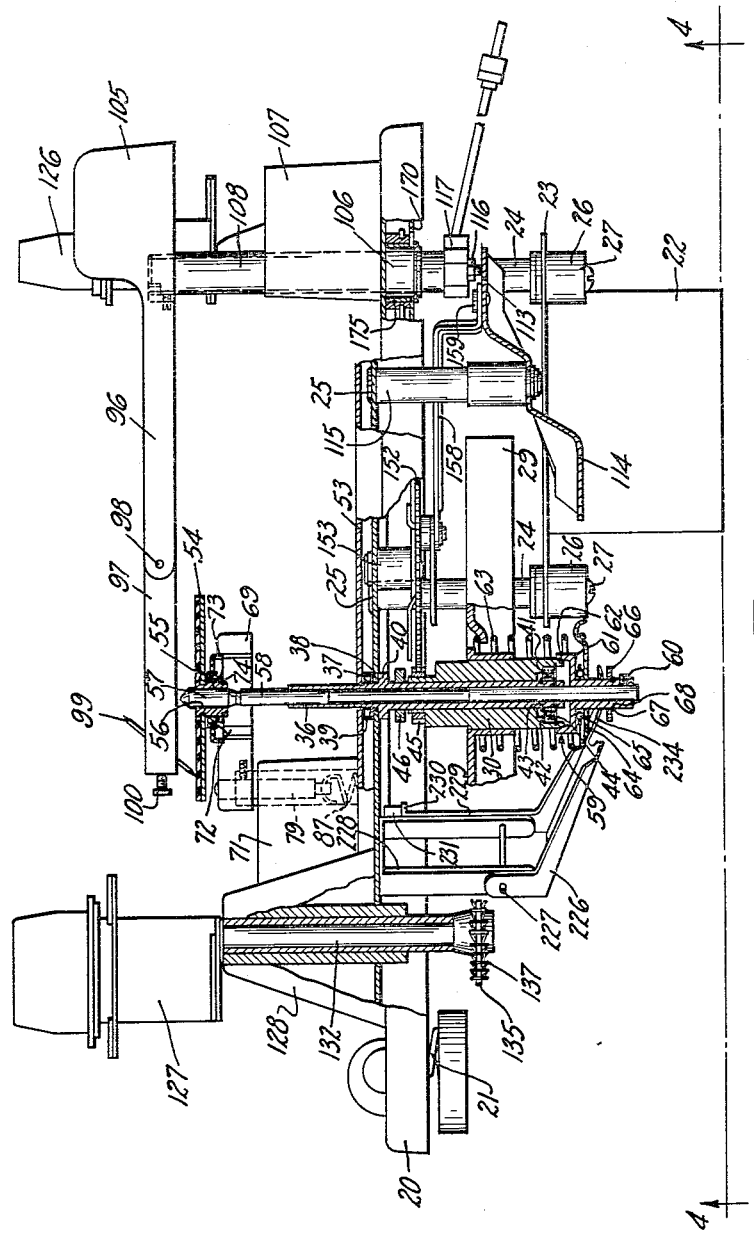

INVENTOR.
FARLOW B. BURT
BY
ATTORNEY

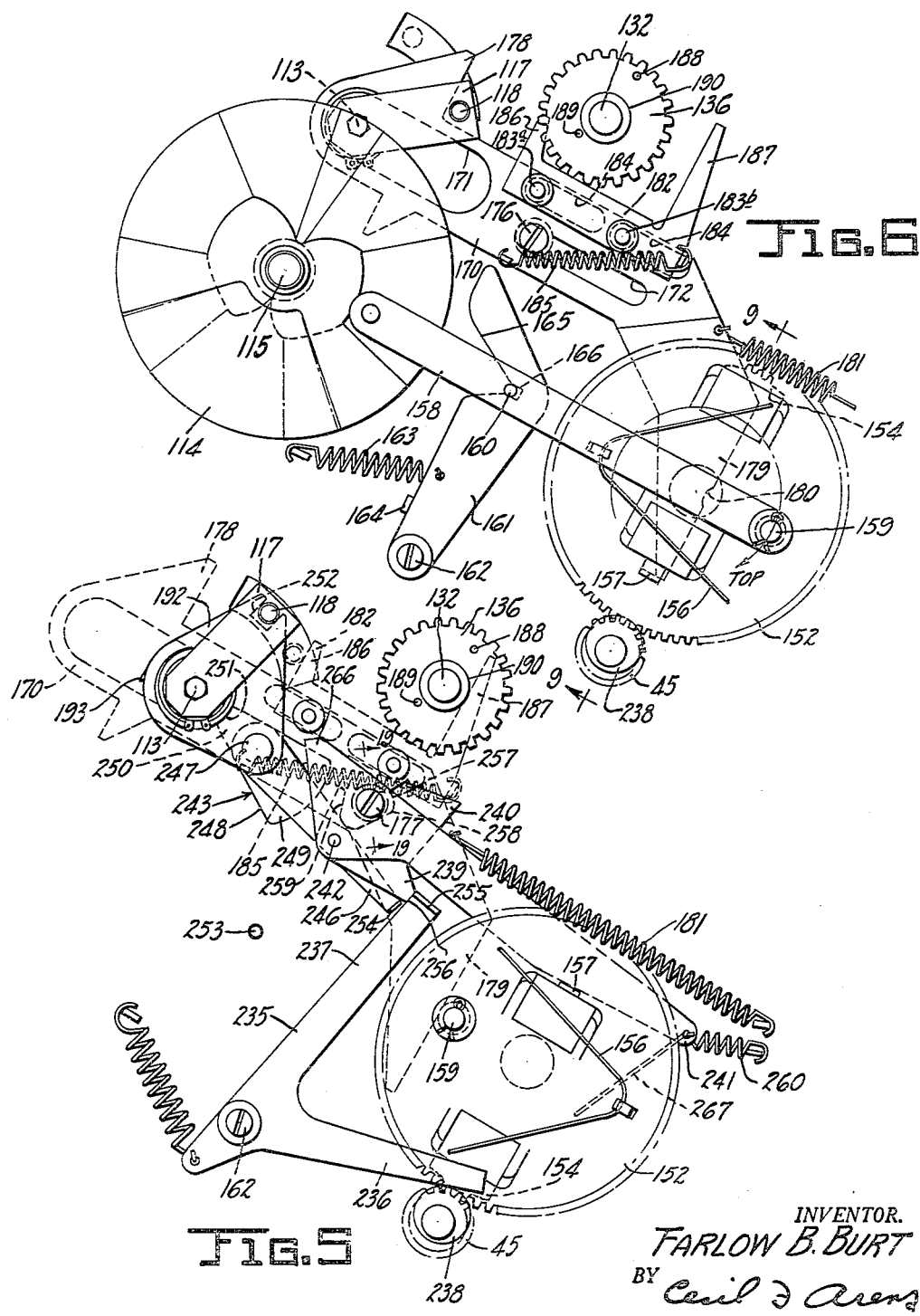

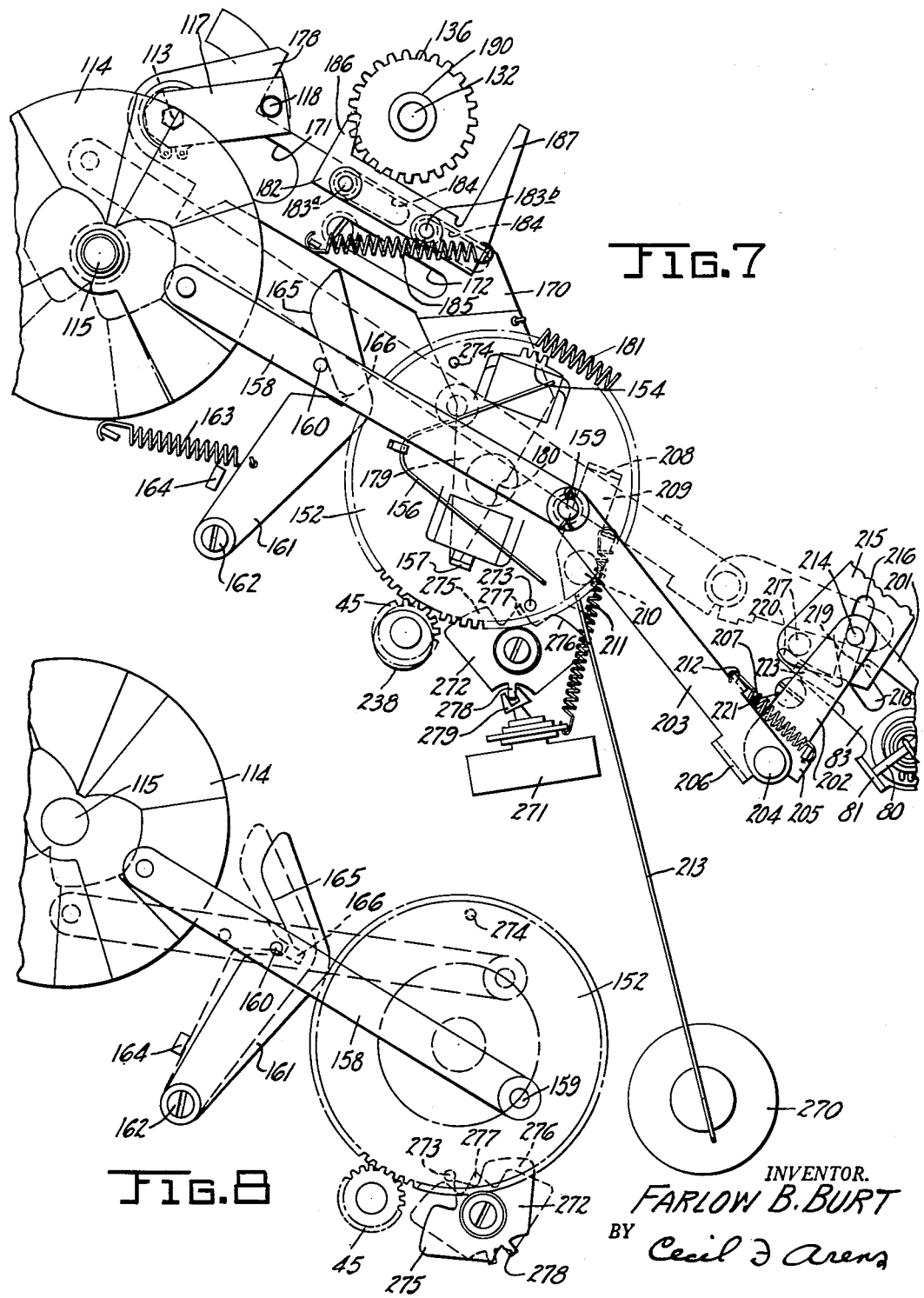

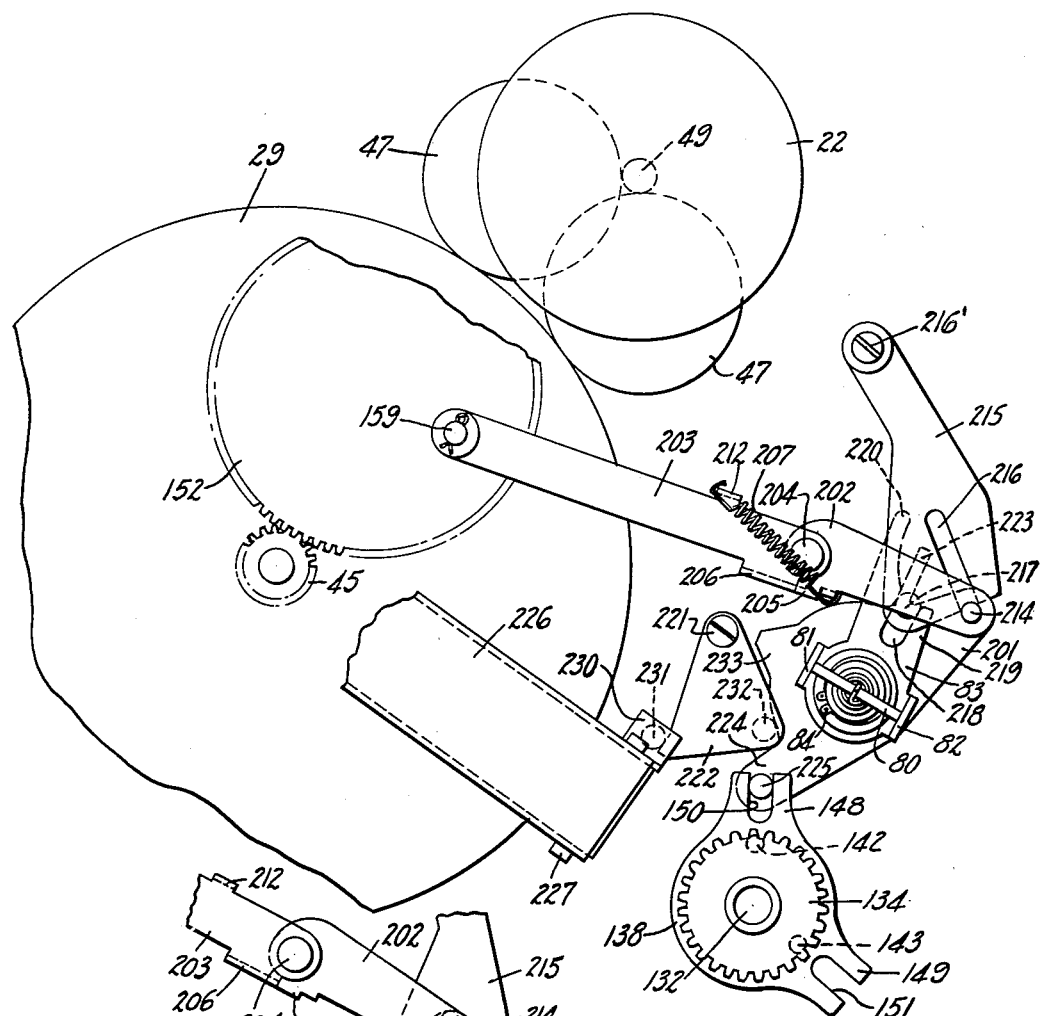
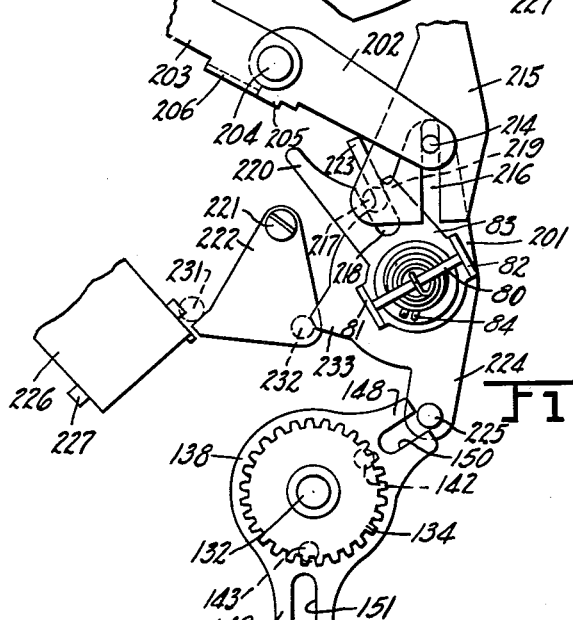

Jan. 17, 1956   F. B. BURT   2,731,272
PHONOGRAPH APPARATUS
Filed Aug. 4, 1949   10 Sheets-Sheet 8
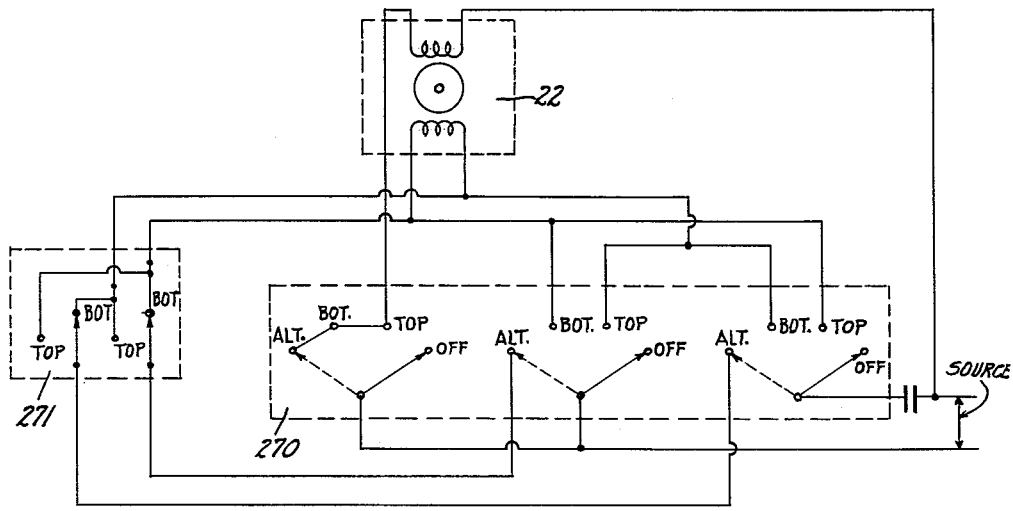
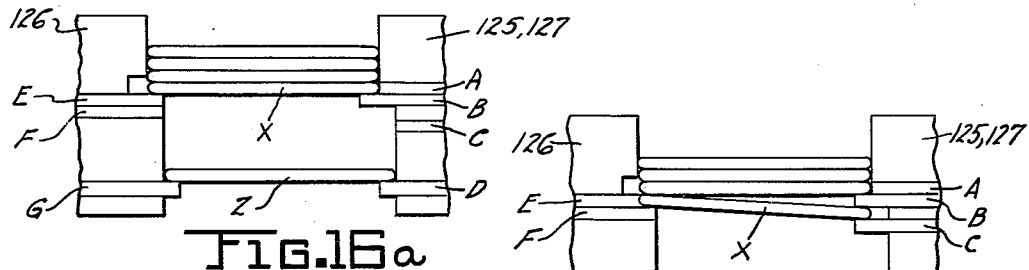
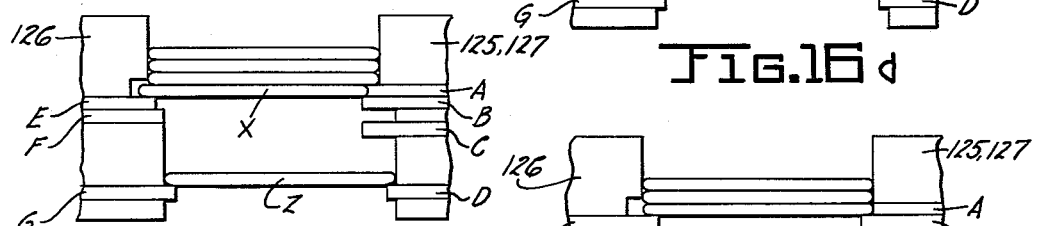
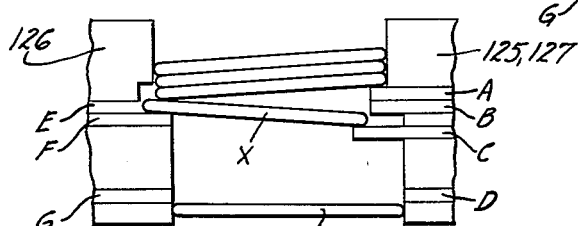
INVENTOR.
FARLOW B. BURT
BY Cecil J Avery
ATTORNEY Jan. 17, 1956  F. B. BURT  2,731,272
PHONOGRAPH APPARATUS
Filed Aug. 4, 1949  10 Sheets-Sheet 9
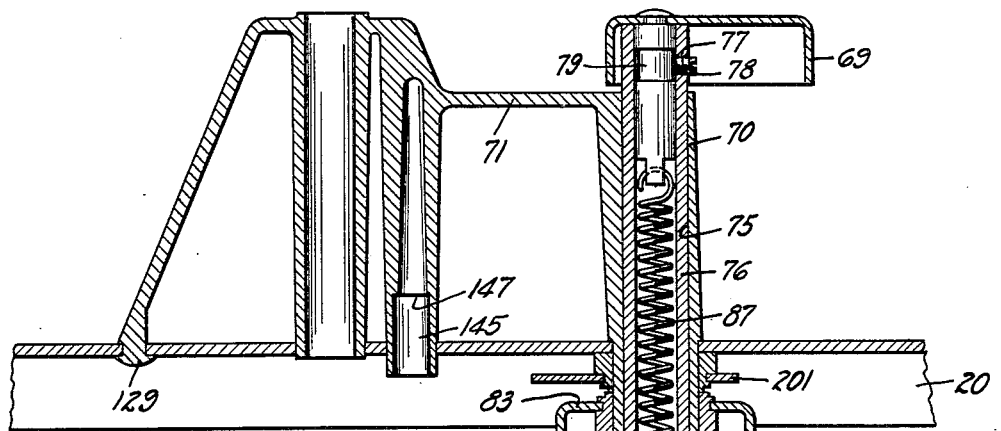
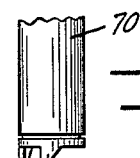
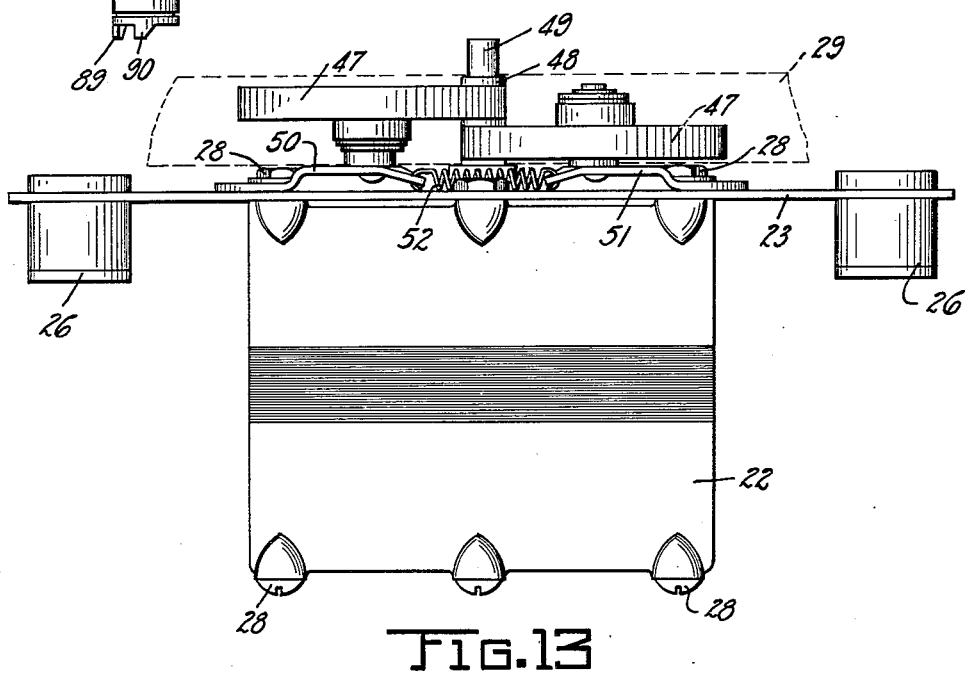
INVENTOR.
FARLOW B. BURT
BY
ATTORNEY Jan. 17, 1956   F. B. BURT   2,731,272
PHONOGRAPH APPARATUS
Filed Aug. 4, 1949   10 Sheets-Sheet 10
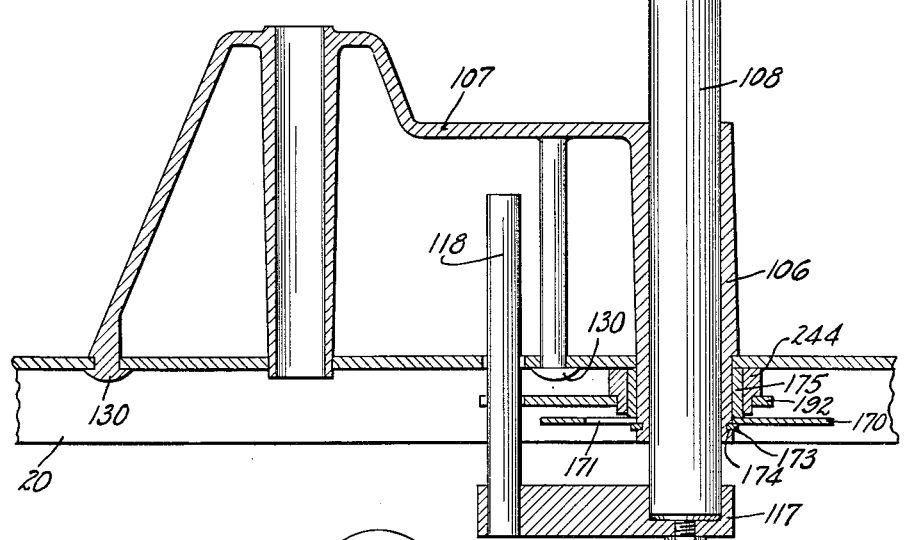
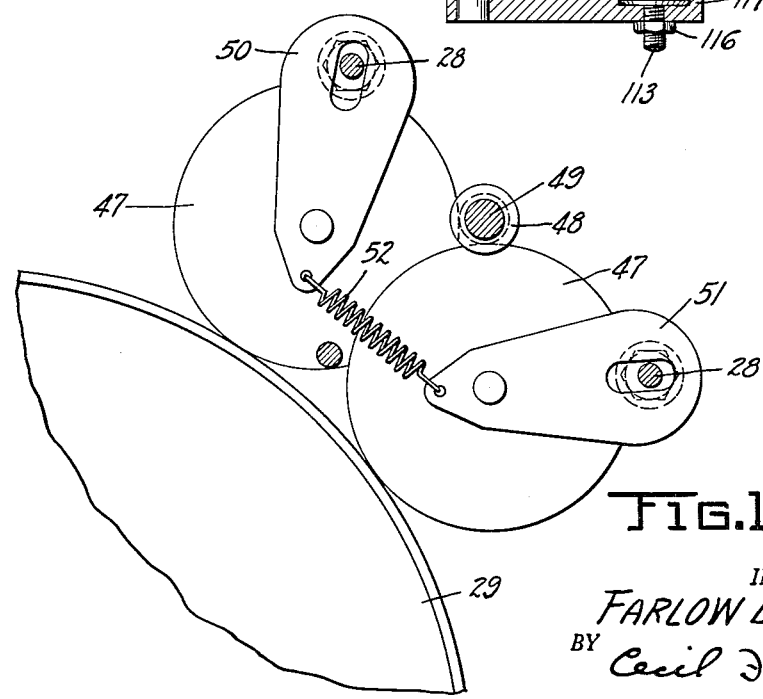
INVENTOR.
FARLOW B. BURT
BY Cecil J Avers
ATTORNEY United States Patent Office 2,731,272
Patented Jan. 17, 1956

2,731,272

PHONOGRAPH APPARATUS

Farlow B. Burt, South Bend, Ind., assignor to Bendix Aviation Corporation, South Bend, Ind., a corporation of Delaware Application August 4, 1949, Serial No. 108,571

3 Claims. (Cl. 274—10)

This invention relates to record changing mechanisms for phonographic apparatus.

It is an important object of the invention to provide a novel record changing apparatus of the type comprising a turntable constructed and arranged to support a record during the reproduction of alternate sides thereof.

Another important object of the invention resides in the provision of a record playing apparatus including a turntable which is rotated through a center drive connection.

A further object of the invention resides in the provision of a record playing and changing apparatus comprising a turntable drivable by a single reversible motor.

It is another object of the invention to provide a record playing and changing apparatus which is simple in construction and operation, and possessing high reproduction qualities.

The above and other objects and features of the invention will be apparent from the following description of the apparatus taken in connection with the accompanying drawings which form a part of this specification, and in which:

Figure 3 is a view in side elevation from the right side of the apparatus of Figure 1 with sections broken away and parts omitted for sake of clarity;

Figure 5 is a view in detail of the trip mechanism, looking in the same direction as viewed in Figure 4, at the instant of initiating a cycle when playing a 10 inch record;

Figure 6 is a view in detail of the tone arm positioning mechanism, looking in the same direction as viewed in Figure 4, when the machine is approximately half way through a cycle and playing top side of a 10 inch record;

Figures 7 and 8 are views similar to Figure 6, except that the changer is set for playing alternate sides of a 10 inch record, and illustrates the various positions of the levers during different phases of a cycle;

Figures 10 and 11 are views in detail of the means for operating the record supporting and releasing means, and the turntable positioning mechanism the latter of which is here shown in an extreme lateral position, that is with the turntable swung outside the record circle when playing a stack of 10 inch records;

Figure 12 is a wiring diagram of the electrical circuit for controlling the motor of the driving mechanism;

Figure 13 is an elevational view of the motor and its driving connections to the drive wheel;

Figure 13a is a top plan view of the driving connections of Figure 13;

Figure 14 is a vertical sectional view taken on the line 14—14 of Figure 1, with the slicer mechanism removed;

Figure 14a is a detail of the structure for limiting the angular movement of the turntable support when moved manually;

Figure 15 is a view in vertical section of the tone arm taken on the line 15—15 of Figure 1, with the slicer mechanism removed;

Figures 16a, 16b, 16c, 16d and 16e are diagrammatic representations of the movement of a record from the bottom of a stack;

*Platform and driving mechanism*

Figure 1:
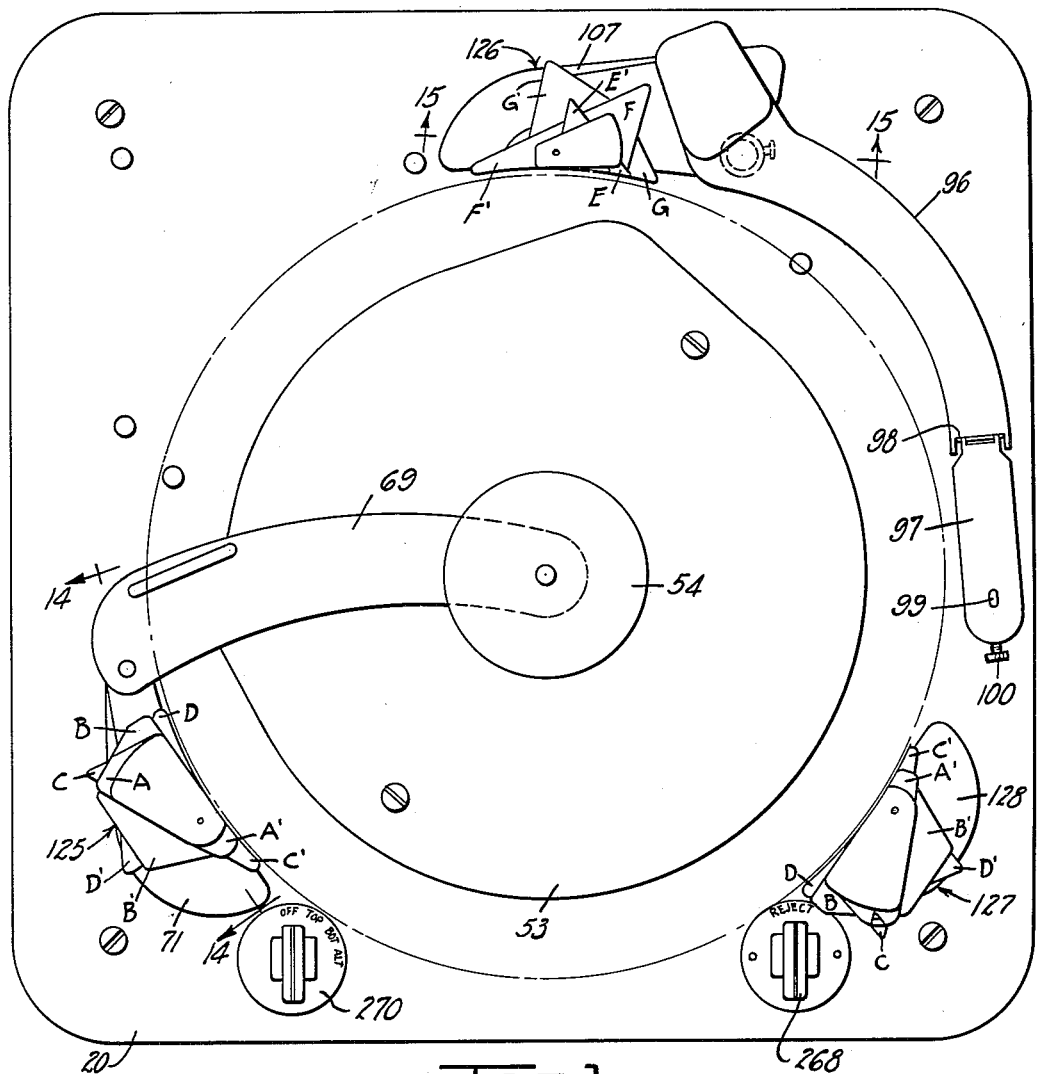
Figure 1 is a top plan view of a phonograph apparatus embodying my invention, showing certain of the parts in the positions they assume when the machine is set for manual operation.

Referring now to Figures 1 to 4 inclusive, the reference numeral 20 designates a platform, which is supported in any suitable manner, on vibration damping mountings or springs 21. The power for the driving mechanism is furnished by a single phase capacitance type reversible motor 22 carried on a mounting plate 23 supported beneath the platform 20 by three depending bosses 24, each having one of its ends peened at 25 for engagement with the platform. The ends of the bosses 24 to which the plate 23 is fastened are equipped with rubber grommets 26 suitably secured to the bosses by screws 27. The plate 23 is thus floatably suspended in these rubber grommets to thereby minimize the transfer of vibrations into the platform. The motor in turn is fastened to the mounting plate by screws 28.

A continuously rotating drive wheel 29, having a hub 30, is supported on the underside of the platform 20 by a tubular support 36, provided with an enlarged threaded section 37, extending through an opening 38 in the platform, for threadedly receiving a locknut 39, which, when tightened will draw an expanded annular portion 40, integral with the support 36, against the bottom side of the platform so as to retain said support in rigid relationship to the platform. A bearing assembly 41 is carried by the lower end of the tubular support 36. The lower end of the hub 30 is recessed at 42 to receive the bearing assembly 41, which is held in position on the hub by snap rings 43. A retaining ring 44 is fitted into a groove in the recess 42 so that a portion of the ring engages the bearing assembly 41 to prevent moving the drive wheel hub 30 vertically along the tubular support. A pinion gear 45 is keyed to the upper end of the hub 30 for a purpose to be hereinafter described. A felt washer 46 encircles the tubular support 36 just above the upper end of the hub. The felt washer is saturated with oil which feeds down the exterior of the support to thereby lubricate the interior of the hub which is in radial contact with the support.

Figure 4:
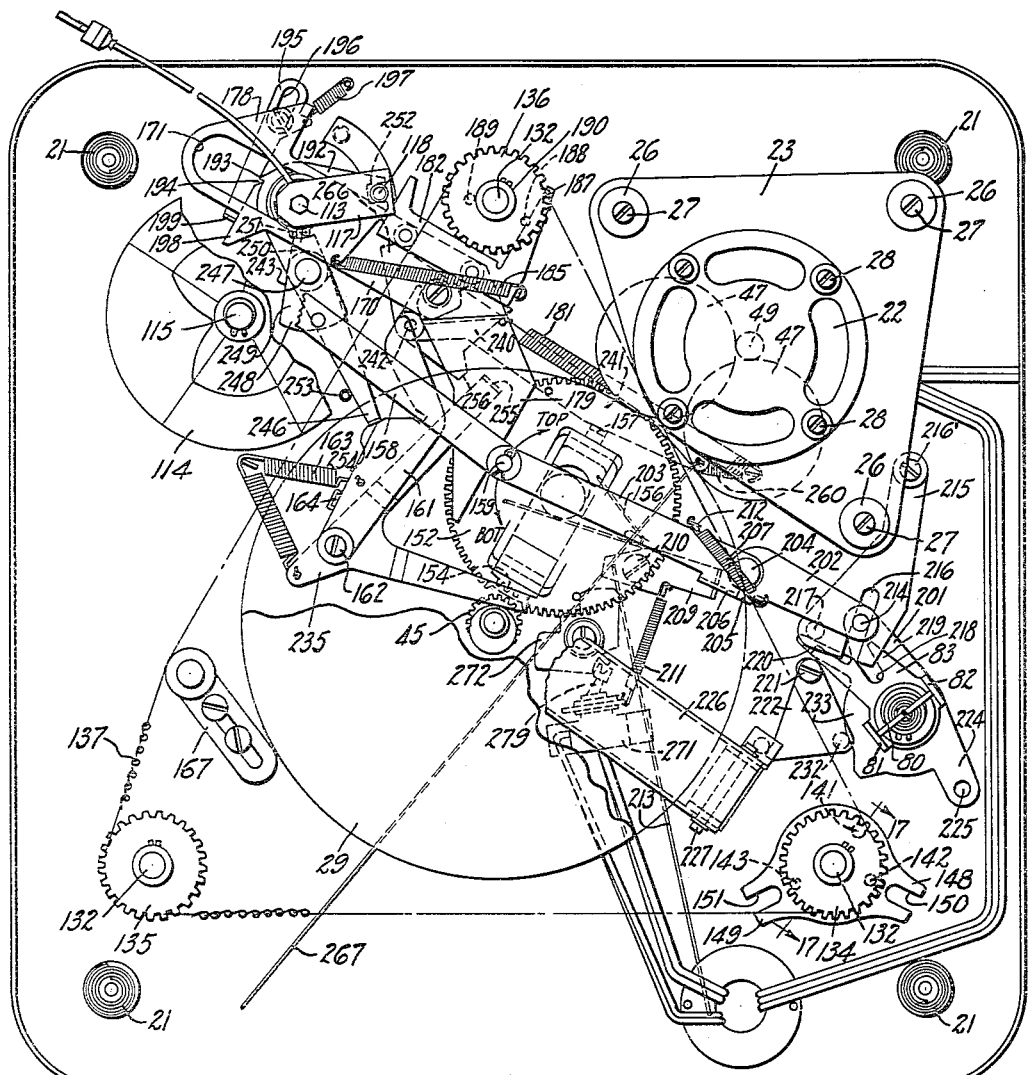
Figure 4 is a view taken on the line 4—4 of Figure 3, with some parts broken away to show more clearly the details of the mechanism.

A pair of wheels 47 are interposed between the periphery of the drive wheel 29 and a pulley or sleeve 48 secured to a shaft 49, of the motor 22, to thereby drivably connect the drive wheel to the motor for clockwise or counterclockwise rotation. As best shown in Figures 13 and 13a, the wheels 47 are carried on brackets 50 and 51, pivotally secured to the motor housing by two of the oppositely disposed screws 28. The wheels 47 are arranged on the brackets so that they lie in different horizontal planes, see Figure 13, thereby permitting overlapping of the wheels, as shown in Figures 4 and 13a. A spring 52 connects the free ends of the brackets 50 and 51, tending to swing them into alignment. This action of the spring on the brackets urges the wheels 47 into contact relationship with the drive wheel and the pulley 48. As viewed in Figure 4, clockwise rotation of shaft 49 will tend to wedge the lower wheel 47 between the shaft and the drive wheel, hence imparting a driving force to the drive wheel. During clockwise rotation of the shaft 49 the upper wheel 47 will tend to swing out from the drive wheel. On the other hand when shaft 49 is rotated counterclockwise the upper wheel 47 tends to wedge in between the shaft and the drive wheel, thus imparting a driving force to the latter. At this time the lower wheel tends to swing out from the drive wheel. With this arrangement pinion gear 45 may be rotated clockwise or counterclockwise.

A cover 53 is secured to the top side of the platform. The platform also forms a magazine for the played records which are stacked below the turntable on the cover.

*Turntable and means for rotating the turntable*

A turntable 54 is provided for rotatably supporting a record during the reproduction thereof. The turntable is constructed with a driving connection in the form of a hub 55 having a tapered hole 56. (See Figure 3.) This tapered hole 56 receives a tapered end 57 of a member or shaft 58 arranged to be moved into and out of engagement with said turntable. A clutch 59 is located at the lower end of the shaft 58 and interposed between the shaft and drive wheel. One part of the clutch is securely fastened to the shaft by a set screw 60. The clutch is constructed with an expanded flange portion 61 which engages a chamfered end 62 of the drive wheel hub 30. A coil spring 63 has one end carried by the drive wheel 29, and its other end attached to a retainer plate 64 to thereby put the spring under tension, thus urging the clutch 59 into engagement with the hub 30 of the drive wheel. A ball bearing assembly 65 is interposed between the retainer plate 64 and the expanded flange portion 61 to provide a relatively frictionless connection through the spring 63 to the clutch, thus permitting the spring and retainer plate 64 to rotate freely with the drive wheel when the clutch is disengaged from the hub and not rotating the member 58. The lower end of the clutch is equipped with a washer 66 retained in position by a clip 67 carried in a groove 68. The function of the washer 66 will be hereinafter described.

The coil spring 63 urges the tapered end 57 of the shaft 58 into engagement with the turntable when the clutch 59 is engaged with the drive wheel hub 30. However, when the shaft 58 is withdrawn from the turntable the turntable is allowed to rest on one end of an arm 69 pivotally supported at its other end in a sleeve 70 integral with a post 71, see Figure 14. The turntable hub 55 fits loosely inside a grommet 72 located at said one end of the arm. The grommet prevents metallic contact between the turntable and arm during cycling operations to eliminate objectionable noise. The turntable is raised vertically off the grommet when the shaft 58 is engaged with the turntable. A washer 73, which encircles the lower end of the turntable hub 55, and is retained in position by a retainer ring 74, engages the grommet 72, when the turntable is raised beyond a predetermined height, thus preventing the removal of the turntable from the arm.

Referring now to Figure 14, the sleeve 70 has an internal bore 75 into which a hollow shaft 76 slidably and rotatably fits. The upper end of the hollow shaft is provided with a radial opening 77 threaded interiorly for the reception of a set screw 78 which securely grips a stub shaft 79 integrally related to the turntable arm 69. The hollow shaft 76 is supported on a cross bar 80, carried by sides 81 and 82 of a turntable positioner plate 83, rotatably sustained on the lower end of the sleeve 70, by a retainer ring 84 which fits into a groove 85 of the sleeve 70. The hollow shaft 76 is furnished with notches 86 for engagement with the cross bar 80. A spring 87 has one of its ends connected to the cross bar 80 and the other end of the spring is securely fastened to the lower end of the stub shaft 79 to thereby force the hollow shaft downwardly. With this arrangement the notches in the hollow shaft may be disengaged from the cross bar to permit swinging the turntable freely about the hollow shaft as a pivot. This is done by first raising the shaft vertically against the force of the spring 87 and then rotating the shaft until the bar and notches are out of registry. The end of the hollow shaft will then ride on the cross bar. In this connection it will be noted that means is provided for limiting the angular displacement of the turntable arm when the shaft is lifted out of engagement with the cross bar. This means comprises a lateral projection 88 integral with the lower end of the shaft and arranged thereon so that the projection will engage one or the other of two axial extending prongs 89 and 90 when the end of the hollow shaft rides on the cross bar, as aforementioned. See Figure 14a.

*Tone arm and support therefor*

Referring now to Figures 3 and 15 the reference numeral 96 designates a tone arm provided with a pickup 97 which is articulated to the tone arm by gimbals 98. The pickup or reproducer is of a common variety except that it is equipped with a double pointed needle 99 held securely in place by a screw 100. The purpose of a double pointed needle is to permit playing alternate sides of a record supported on the turntable. The said pickup may be electrically connected to any conventional type of amplifier and speaker for reproduction of the sound. It will be noted that the relatively long tone arm is counterbalanced by an enlarged weighted portion 105 integral with the tone arm, to thereby reduce the radial thrust imparted to sleeve 106, of post 107, by shaft 108, which slides and rotates freely in the sleeve. The upper end of the shaft 108 fits into a socket 109 of the tone arm. Two set screws 110, only one of which is shown, threadedly engage the socket 109, so that their ends engage the upper end of shaft 108 to securely fasten the tone arm and shaft together. These set screws enable the tone arm to be adjusted angularly for any predetermined position. A slot 111 in the shaft registers with an aperture 112 terminating in the socket for receiving wires, not shown, connected to the pickup. The lower end of the shaft is provided with a round head screw 113 which rides on a cam 114, rotatably supported from the platform 20 by a stud 115. The transversely extending arm 117 is press fitted onto the end of the shaft 108. The adjustable round head screw 113 threadedly engages the arm 117 and is furnished with a lock nut 116, which is drawn up tightly against the arm. The free end of the arm 117 carries a vertically extending pin 118, the function of which is to provide a driving connection to the shaft 108 for positioning the tone arm angularly, as hereinafter described. The cam 114 when rotated, as will be hereinafter described, will position the tone arm vertically for playing either the top side or bottom side of a record.

*Means for releasably supporting a stack of records above the turntable*

Figures 2, 18:
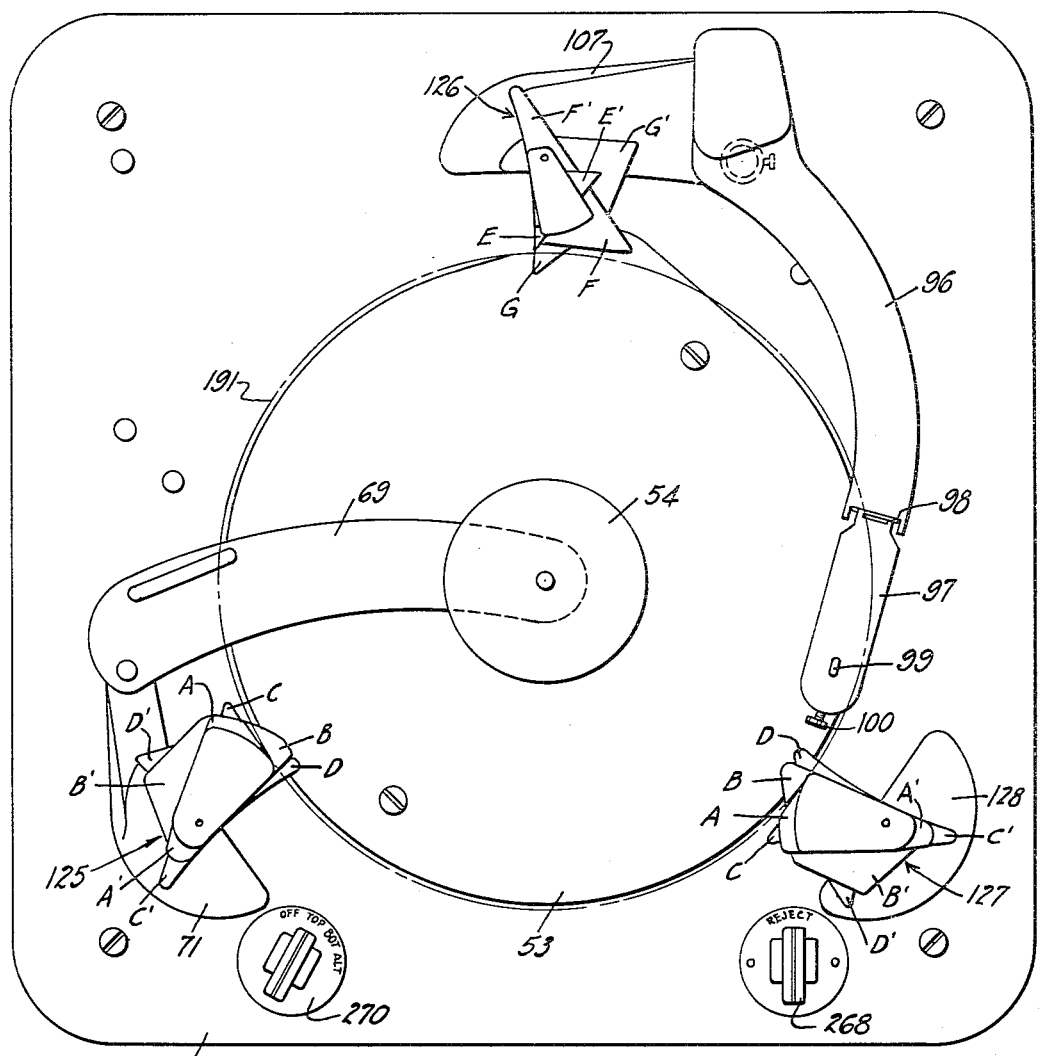
Figure 2 is a top plan view of the phonograph apparatus with the record releasing and supporting means set for handling a stack of 10 inch records.
Figure 18 is a schematic layout of the profile of the cam for positioning the tone arm vertically.

As shown in Figures 1 and 2 the record supporting and releasing means comprises a set of three supports 125, 126, and 127 rotatably carried respectively, by the posts or bosses 71 and 107, which also form thrust bearings for the turntable and tone arm shafts, and a third post 128. These posts are fastened to the top side of the platform in any suitable manner, such as by upsetting the ends of fingers 129, 130, and 131 of posts 71, 107, and 128 respectively, see Figures 14 and 15. These fingers extend through openings, not shown, in the platform.

Figure 1 shows the position of the record supporting and releasing means when the changer is set for manual play. Figure 2 illustrates the position of the record supports when it is desired to automatically play a stack of 10 inch records. Of the three sets of supports for the record supporting and releasing means, two of the sets are of identical construction and only one of these will be described in detail. The two identical sets of supports 125 and 127 are pivotally carried in posts 71 and 128. The record support 127, carried by post 128, is provided with a stem 132 which has its lower end extending below the platform 20. As best illustrated in Figures 1, 2, and 3 etc., the record support 127 is equipped with a set of four tiers or levels A, B, C, and D for the 10 inch records and A', B', C', and D' for 12 inch records. The third record support 126 is also furnished with a similar stem 132 which extends through the post 107 but differs in other respects from the record supports 125 and 127. The record support 126 is furnished with only three tiers or levels E, F, and G for 10 inch records and E', F', and G' for 12 inch records.

The ends of the three stems 132 which extend below the platform 20 are furnished with sprockets 134, 135, and 136 over which a chain 137 travels, thus connecting the three sets of record supports together for simultaneous rotation. An idler adjustment 167 is secured to the underside of the platform for controlling the tension in the chain 137, see Figure 4.

Figure 17:
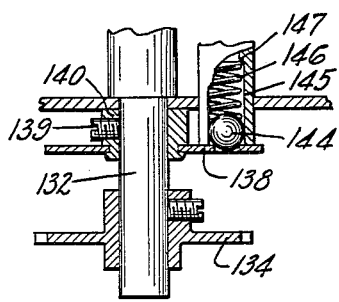
Figure 17 is a view in section taken on the line 17—17 of Figure 4.
Figure 19:
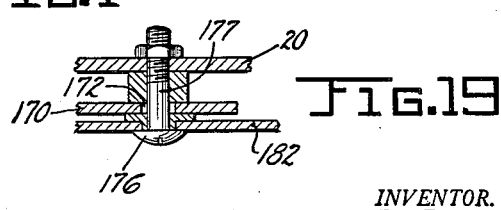
Figure 19 is a view in section taken on the line 19—19 of Figure 5.

In order to accurately position the record supports as well as retain the supports in a preselected position for playing either 10 or 12 inch records a detent mechanism is provided. See Figures 4, 14, and 17. The mechanism comprises a plate 138 drivably secured to the stem 132, of the record support 125 by a set screw 139 threadedly disposed within a hub 140 integral with the plate 138. The plate 138 is formed with three radially located openings 141, 142, and 143, angularly spaced apart on the same circumference a prescribed distance to facilitate positioning of the record supports for manual and automatic playing. A ball 144 is loosely disposed within a hollow projection 145, integral with the post 71. A spring 146 is positioned in the hollow projection so that one end of the spring abuts a shoulder 147 and the free end of the spring rides on the ball, to thereby force the ball downwardly against the plate 138. The plate is provided with lateral projections 148 and 149 formed with radial extending slots 150 and 151 respectively to be engaged by a mechanism to be hereinafter described for driving the record supports for 10 and 12 inch records. That is, when the machine is set for automatically playing 10 inch records the opening 142 in the plate 138 will be engaged by the ball 144.

With reference to Figures 2, 16a, 16b, 16c, 16d and 16e, the record supporting and releasing means is positioned for carrying a stack of 10 inch records to be fed to the turntable 54 consecutively from the bottom of the stack. The lowermost record of the stack rests on tiers B of the supports 125 and 127 and tier E of support 126. In cycling the machine to transfer the lowermost record X from the stack to the tiers D and G where the record is to be picked up by the turntable the following sequence of record movement takes place. The three record supports are caused to rotate or oscillate clockwise so that the identical tiers A, which are located above tiers B on which the stack rests, engage the edge of the lowermost record X thus urging it in a horizontal plane so that the record slides along tier E. At the same time that the tiers A are urging the record in the aforementioned direction tier E is being rotated out from under the record and tier C is being rotated to a position directly beneath the record to provide temporary support for the record until dropped to tier D. Movement of the tiers in the clockwise direction continues until one edge of the record is pushed off tiers B onto tier C and the opposite edge of the record is dropped from tier E onto tier F, at which time the rotation of the supports is reversed. At the time of reversal the record is suspended temporarily on tiers C and F and the stack is carried by tiers A and F. It will be remembered that tier A urged the lowermost record off tier B and simultaneously slid under the stack to give it temporary support during clockwise rotation of the supports. Tier E likewise moved out from under the lowermost record and is at the same level as the record which is now resting on tier F. See Figure 16c.

Rotation of the supports in a counterclockwise direction causes tier E to engage the edge of the record as this tier returns thus sliding the record off tier F. Concurrently with moving one edge of the record off tier F by tier E the opposite side of the record was suspended by tier C, which was withdrawing in timed relationship to the action of tiers E and F, to thereby drop the record onto the bottom tiers D and G.

If a record Z had been resting on tiers D and G at the time a cycle was initiated this record will have been deposited in the magazine below the turntable. The tiers D and G rotate out from under the record Z, deposited thereon, in timed relationship to the transfer of the lowermost record X, which is resting on tiers B and E, to tiers C and F. See Figure 16c.

Tone arm positioning means

The means for positioning the tone arm must be capable of raising and lowering the tone arm to positions of playing top and/or bottom sides of a record, as well as positioning the tone arm laterally for playing 10 or 12 inch records. See Figures 3 to 7.

Figure 9:
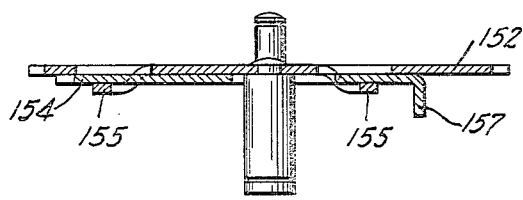
Figure 9 is a section taken on line 9—9 of Figure 6.

The mechanism for positioning the tone arm vertically comprises an interrupted gear 152, rotatably secured on the underside of the platform to a boss 153, carried by the platform. The gear 152 is arranged to be drivably connected to the pinion gear 45 through a sector 154, carried on the interrupted gear 152. The interrupted gear is formed with a pair of diametrically spaced apart loops 155, offset from the plane of the interrupted gear, to slidably receive the gear sector 154 as shown in Figure 9. During a non-cycling period the interrupted gear 152 is positioned so that a mutilated portion thereof is in registry with the pinion gear 45. At this time the gear sector is withdrawn from engagement with the pinion gear under the action of a U-shaped spring 156, which has one end fixed to the interrupted gear and its other end, or free end, in driving engagement with the gear sector. The gear sector is provided with a lug 157 extending at right angles to the interrupted gear for actuation through a trip mechanism to be hereinafter described. A lever 158 has one end pivotally carried on a pin 159, secured to the interrupted gear, and the other end pivotally fastened to the cam 114. The lever 158 is provided with a boss 160 located on one side of the lever for engagement with a lever 161 which is pivotally suspended from a stud 162 threadedly engaging the underside of the platform. A spring 163 has one of its ends secured to the platform and its free end fastened to the lever 161 to thereby rotate the lever against a stop 164 carried by the platform. The lever 161 is formed with a V-shaped cutout portion 165 for guiding the boss 160, of lever 158, into a slot 166, located at the vertex of the V-shaped cutout portion. This slot 166 provides a fulcrum for the lever 158 so that the cam will be rotated in the correct direction when the apparatus is cycled.

Assume that records are being played topside and that the machine has cycled.

Also assume that rotation of the interrupted gear is clockwise, as viewed in Figures 4 and 6, the end of the lever 158, which is pivotally carried on pin 159, will follow around with the pin in the direction of the arrow designated Top. As that end of the lever 158 carried by the interrupted gear follows around the gear in a clockwise direction the boss 160 will move into contact with the upper side of the U-shaped cutout portion. After the pin has rotated substantially 180° in a clockwise direction the boss 160 will have been guided along the upper side of the V-shaped portion and into the slot 166. Continued rotation of the interrupted gear in a clockwise direction from this point on will obviously cause that end of the lever 158 fastened to the cam 114 to be pivoted clockwise around the boss 160 with slot 166 acting as a fulcrum. It will be noted that during the first half of the cycle, first 180° rotation of the gear 152, the cam is rotated clockwise and during the last half of the cycle the cam is rotated counterclockwise, that is, the cam is returned to its original position for playing another record topside.

Assume the bottom side of a record is to be played and that the cam is positioned for playing the top side of a record. See Figures 7 and 8. Also assume that the interrupted gear 152 is caused to be driven in a counterclockwise direction as designated by the arrow marked Bot. Rotation of the gear in this direction moves the boss 160 of lever 158 into contact with the lower side of the V-shaped cutout portion 165. Continued rotation of the gear 152 will cause the boss 160 to ride along the lower side of the V-shaped cutout portion and into the slot 166 by the time that the gear has rotated approximately 180°. As the gear continues to rotate beyond 180° the lever 158 is swung in a counterclockwise direction around the boss 160 as a pivot which is fulcrumed in slot 166 (see dotted line position of lever 158, Figure 8). The cam 114 will now be driven clockwise as the gear 152 continues to move in a counterclockwise direction. It will be observed that in moving the tone arm from top side to bottom side of a record the cam has been continuously rotated in one direction under the action of the lever 158 assisted by lever 161, which provides a fulcrum for the first named lever.

In a case where the records are being played all bottom side, the end of the lever 158 pivoted to the cam is now positioned on the lower side of the center of rotation of the cam, as viewed in Figure 8; it will be remembered that when the records were being played all top side this end of the lever 158 was positioned above the center of rotation of the cam. Rotation of the interrupted gear 152 in a counterclockwise direction will first swing the boss 160 of lever 158, into contact with the lower side of the V-shaped cutout portion. Continued rotation will move the boss into the slot 166 and also pivot the lever 158 in a counterclockwise direction so that that end of the last mentioned lever which is fastened to the cam 114 will be returned to its starting position, that is, on the lower side of the center of rotation of the cam.

Figure 18 shows a schematic layout of the profile of the cam 114 for positioning the tone arm vertically.

To analyze the rise and fall of the tone arm on the cam as it rotates, consider the vertical arrow on the right as the position of rest of the tone arm when it is positioned vertically for playing the top sides of a stack of records. Hold this vertical arrow fixed and imagine the cam profile moving in a horizontal direction, that is, in a straight line across the sheet, to the right until the center line coincides with the upright arrow then reverse the motion of the cam profile and return the same to its starting position. To follow the action of the cam when playing the bottom sides of a stack of records hold the upright broken line arrow on the left fixed and imagine the cam profile moving to the left until the center line is in line with the upright arrow, then reverse the direction of the cam profile and return the same to the starting position. When moving the tone arm from top to bottom side the vertical arrow on the right should be held fixed and imagine the cam profile being moved in a straight line until the vertical arrow on the left registers with the arrow on the right. This will be the new playing position for the tone arm. In transferring the tone arm from the bottom to the top side hold the vertical arrow on the right and imagine the cam profile being returned to the position shown in the Figure 18.

As shown in Figures 3, 6, 15, and 19, the mechanism for positioning the tone arm laterally, that is, angularly with respect to its position from a center point on the platform, comprises a tone arm drive member 170, furnished with closed slots 171 and 172 for slidably supporting the drive member. Slot 171 is of sufficient width to fit over the sleeve 106 of the post 107, and is carried between a retainer ring 173, fit into a groove 174, of the sleeve 106, and the under side of a bushing 175 fit over the sleeve 106. The edges of slot 172 ride on a head 176 of a screw 177, which engages the underside of the platform 20, to thereby provide additional support for the tone arm drive member 170.

The ends of the drive member 170 are formed with oppositely displaced laterally extending projections 178 and 179. The projection 179 is provided with an arcuate cutout section 180 into which the pin 159 rides when the mechanism is in the position shown in Figure 4. A spring 181 has its free end fastened to the end 179 of the drive member 170 and the other end of the spring is secured to the underside of the platform to thereby load the drive member in a direction causing it to ride against the pin 159 at times. Any rotation of the interrupted gear and hence pin 159 from the position shown in Figure 4 will cause the drive member 170 to move to the right under the influence of the spring 181. This movement of the drive member to the right will not be immediate since the drive member must be first moved to the left by the pin 159 as it rotates out of the cutout portion 180. The drive member will move in a straight line since it is guided in the closed slots 171 and 172. The vertically extending pin 118, carried on the free end of the arm 117, projects upwardly into the path of movement of the lateral extension 178. This lateral extension 178 and its associated mechanism functions as a return device for repositioning the tone arm outside the record circle.

For positioning the tone arm within the record circle corresponding to the selected record to be played, that is, positioning the tone arm laterally for playing 10 or 12 inch records requires some form of sensing device which can detect the size of a record to be played and then set the tone arm accordingly. This is done by a member 182 slidably mounted on the drive member 170 for straight line movement parallel to the action of said drive member, which as aforementioned moves in the slots 171 and 172. The member 182 is suitably fastened by bolts 183a and 183b for sliding action in slots 184 of the drive member 170. This member 182 is urged to the left with respect to the drive member, on which it is mounted, by a spring 185 which has one end secured to the drive member and the other end fastened to the member 182. The member 182 is provided with laterally projecting fingers 186 and 187 located at opposite ends of the member and extending in the same direction. Finger 186 rides against the pin 118 when the changer apparatus is set for automatically playing 10 or 12 inch records. However, in the non-automatic position of the apparatus shown in Figure 4 the finger 186 is held out of contact relationship with the pin 118 by the finger 187, which at this time abuts a pin 188 carried by the sprocket 136. In the non-automatic position of the apparatus, that is, during manual operation of the machine there should be no interference with the manual control and positioning of the tone arm, hence the reason for locking the member 182 in the aforementioned position. The finger 187 abuts a pin 189, carried on the sprocket 136, when the record supporting and releasing means is set for playing 12 inch records. When the machine is set for playing 10 inch records the finger 187 will ride on an appropriately proportioned hub 190, integral with the sprocket 136.

It is obvious from the aforementioned discussion that whenever the record supporting and releasing means is set, for example, for handling a stack of 12 inch records the plate 138 is rotated into detent opening 143. Since the sprocket 134 and plate 138 are secured to the same stem 132, and chain 137 is drivably connected to sprocket 136, any rotation of sprocket 134 will rotate the sprocket 136 to thereby position the pin 188 for engagement with the finger 187. The finger 186 will now be allowed to move to the left under the influence of the spring 185 to thereby position the tone arm laterally for playing 12 inch records. With the plate 138 rotated so that the ball 144 registers with the detent opening 142 the sprocket 136 will have been rotated so that the finger 187 rides on the hub 190. This time the finger 186 will be allowed to move farther to the left under the influence of the spring 185 to thereby position the tone arm laterally for playing a 10 inch record, as shown by the dotted line position of pin 118, Figure 5.

Assume that a 10 inch record is being played and that the tone arm has rotated to the inner grooves of a record, as shown by the full line position of pin 118, Figure 5.

When the machine is cycled to cause the interrupted gear to revolve, the action of the cam 114 in changing the vertical position of the tone arm is immediate, to thereby withdraw the tone arm from following in the grooves of a record. However, there is some delay in shifting the tone arm laterally so as to allow the previously mentioned withdrawal of the tone arm from the grooves of the record. This delay is accomplished by providing a minimum space between the projection 178 and the pin 118, when the latter is in its extreme outward position where it will be at a time when the tone arm is following in the inner grooves of a record. See Figure 5. With this space between the projection 178 and the pin 118, there will obviously be a predetermined amount of travel of the projection before engagement with the pin 118. As the gear continues to rotate, the drive member will follow the pin 159 under the influence of the spring 181 during a part of the first half of the cycle or approximately 180° rotation. During the last half of the cycle, that is, after the pin 159 has moved across dead center and is returning to its starting point the pin rides against the projection 179 to thereby push the drive member to the position of Figure 4. Since the sprocket 136 is positioned so that the finger 187 abuts the hub 190, the required setting for playing 10 inch records, the finger 186 will be carried to the left as the drive member is pushed by the pin 159. The finger 186 will engage the pin 118 at about the position shown in Figure 4 and move the pin to the position shown in dotted lines in Figure 5 whereby the tone arm is angularly positioned for a 10 inch record. Although the finger 187 will stop at a preset position, the drive member will continue to move to the left under the influence of pin 159.

In order to prevent the tone arm from overshooting, that is, to prevent the tone arm from coasting beyond its preselected position, due to its inertia, a braking device is used which comprises a plate 192 rotatably carried on the sleeve 106 and driven by the tone arm. The detail of the plate mounting and its further functions will be described more specifically in connection with the trip mechanism. However, with regard to its present use the plate 192 is provided with a latch 193 which rotates into engagement with a corresponding latch 194 on member 195. The member 195 is slidably and rotatably carried in a slot 196 to permit lateral movement thereof as the plate 192 is rotated counterclockwise as viewed in Figure 4. A spring 197 loads the member in a direction tending to rotate it counterclockwise for latching engagement with the plate 192.

To provide for disengagement of the plate 192 from the latch 194, to permit free angular movement of the tone arm after it has been positioned for playing a 10 or 12 inch record the tone arm drive member 170 is formed with a lateral projection 198 which engages an end 199 of the member 195 to rotate the same in a clockwise direction as the drive member reaches its extreme position to the left. After the unlatching of plate 192 the drive member 170 is returned to the right under the influence of the spring 181 as the pin 159 rotates into the cutout section 180 of the tone arm drive member at the end of the cycle. The member 195 is now positioned for latching the plate 192 when the tone arm is returned to a position outside the record circle.

*Mechanism for positioning the turntable beneath a stack of records carried by the record supporting mechanism*

It is a primary purpose of this mechanism to automatically position the turntable for receiving a record from the record supporting and releasing means. The mechanism also swings the turntable outside an imaginary record circle 191 inscribed by the records of the stack, see Figure 2, to thereby permit depositing the played record on the platform beneath the stack of records. The mechanism embraces the turntable positioner plate 83 which is interconnected with the interrupted gear 152 through a compound linkage, including an actuator plate 201, pivotally secured to a jackknife connection, and having levers 202 and 203. The ends of the levers 202 and 203 forming the jack-knife connection are pivotally joined together by a rivet 204. The contiguous ends of these two levers 202 and 203 are formed with mutually engageable portions 205 and 206 respectively, so that this jack-knife connection can be rendered rigid at times and collapsible at other times. A coiled spring 207 has its ends connected to the adjacent ends of the levers 202 and 203 so that the axis of the spring is below the center of pivot of the levers to thereby rotate the levers and bring the mutually engageable portions 205 and 206 together. Obviously if either lever 202 or 203 were rotated about rivet 204 so that the axis of spring 207 were above the center of the rivet the jack-knife connection would collapse. See Figures 7 and 11.

When the record changing apparatus is set for automatically playing either all top sides or all bottom sides of a stack of records the apparatus will swing the turntable outside the record circle each time after reproduction of the played record, to thereby allow the played record to be deposited in the magazine below the stack. The turntable will then be swung back under the stack to receive another record. However, when playing alternate sides of a record the turntable should not be swung out from under the stack after the reproduction of the top side since the bottom side is to be played with the record in the same position on the turntable. Some means must, therefore, be provided for maintaining the turntable in its playing position when cycling the machine for shifting the tone arm from the top to the bottom side of a record. This means includes the jack-knife connection and a movable stop 208 carried on one end of a member 209, which is pivotally supported on the underside of the platform by a screw 210. A spring 211 rotates the member 209 to the position shown in Figure 4 so that the stop 208 will not be engaged by lug 212, integral with the lever 203, when the changer is set for playing top or bottom side. However, a wire connection 213 is secured to the end of the member 209, opposite the stop 208, to thereby rotate the member against the force of spring 211 until the stop 208 is in the position shown in Figures 7 and 11, when the changer is set for alternate play. The stop 208 is thus positioned to engage the lug 212, of the lever 203, when the changer is cycled after reproduction of the top side of a record, whereby the jack-knife connection is collapsed so as to render the turntable positioning mechanism inoperative.

The actuator plate 201 is carried on the lower end of the sleeve 70 just below the platform 20, and is revolvably held on the sleeve by the retainer ring 84. The jack-knife connection is interconnected with the actuator plate through a pin 214. The actuator plate 201 and the lever 202, of the jack-knife connection, have their adjacent ends spaced apart in overlying planes so that a multiplying lever 215, provided with a slot 216, for engagement with the pin 214, can be interposed between the plate 201 and lever 202. The multiplying lever 215 is pivotally fastened to the platform by a stud 216'. The free end of the lever 215 is equipped with a pin 217, which rides in a slot 218 formed between fingers 219 and 220 of the turntable positioner plate 83. The finger 220 is slightly longer than finger 219, so that the pin 217 will remain engaged with the first named finger to thereby rotate the plate 83 to the position of Figure 4, where the finger 220 abuts a stud 221 which rotatably carries a force transmitting arm 222, the function of which will be hereinafter described. The actuator plate 201 is formed with an outwardly projecting element 223 which abuts the stud 221 so that the plate 201 will not be swung counterclockwise beyond a fixed point under the influence of the spring 207 when the jack knife is collapsed. The arrangement of the pin 217 with respect to the slot 218 is such that the pin does not immediately move into the slot when the changer is cycled but does so only after the actuator plate has been rotated a predetermined angular distance depending on the amount of delay required before turntable movement is desired. This delay in swinging the turntable is necessary to allow for the withdrawal of the drive pin 58. The connection between the turntable positioner plate 83 and the actuator plate 201 is such that the angular displacement of the former plate is multiplied. This is necessary to swing the turntable the required angular distance outside the record circle.

Mechanism for actuating the record supporting and releasing means

This mechanism embraces substantially the same structure as the turntable positioning mechanism except that the actuator plate 201 is provided with an extension 224, on which is mounted a pin 225, adapted to engage in one or the other of slots 150 and 151, to thereby cycle the record supporting and releasing means. Whether the pin 225 engages in the slot 150 or 151 depends on whether the record changer is set up for playing 10 or 12 inch records. See Figures 10 and 11.

Means for disconnecting the turntable drive

As well as embracing much of the turntable positioning mechanism the instant means includes the force transmitting member 222 interposed between the actuator plate 201, and a crank arm 226, pivotally carried by a pin 227 supported in a bracket 228 secured to the underside of the platform. See Figures 3, 4, and 10. The crank arm 226 is furnished with an upwardly extending element 229, bent over to form a tab 230 for mounting a lug 231, against which one edge of the force transmitting arm 222 rides, as shown in Figure 11. The opposite edge of the arm 222 carries a cylindrically shaped boss 232 against which a cam 233, integral with the actuator plate 201, rides. The crank arm 226 is equipped with a bifurcated end 234 which fits over the clutch 59. This bifurcated end rests on the washer 66 carried on the clutch. Rotation of the actuator plate 201 pivots the crank arm about its fulcrum pin 227 to thereby cause the clutch to disengage the chamfered end 62 and simultaneously withdraw the shaft 58 from engagement with the turntable 54, see Figure 3. The above action of the crank arm is against the spring 63 which now returns the shaft 58 to engagement with the turntable and re-engages the clutch with the chamfered end 62, when the actuator plate is rotated back to the position of Figure 4.

It will be remembered that in the discussion of the turntable positioning means it was pointed out that the angular displacement of the turntable from its playing position was delayed to allow for the withdrawal of the shaft 58. An examination of the location of the cam 233, on the actuator plate, shows that the cam will ride on the boss 232 before the pin 217 imparts rotation to the positioner plate 83, thus transmitting motion to the crank arm 226 through the arm 222, to thereby withdraw the shaft 58 from the turntable prior to lateral displacement of the turntable, see Figure 10.

Trip mechanism

It is a purpose of the trip mechanism to provide means for automatically connecting the driving mechanism to the turntable positioning mechanism, to the tone arm positioning means, and to the record releasing and supporting means.

The trip mechanism, as best shown in Figures 4 and 5, comprises an oscillatable forked lever 235 pivotally carried by the stud 162, so that tines 236 and 237 respectively, of the forked lever, engage cams 238 and 239. The cam 238 is integral with the upper end of the hub 30 and the cam 239 is formed in a latch plate 240, rotatably carried by a reject lever 241. The latch plate 240 is fastened to the reject lever by a rivet 242 disposed radially from the screw 177 to which the reject lever is pivotally mounted. Rotation between the reject lever and latch plate is free but not frictionless, so that the latch plate will tend to remain in any position to which it is rotated under the action of a frictional linkage trip 243, carried on a hub 244, which is mounted for rotation on the sleeve 106 and held in position by the retainer ring 173. The bushing 175 encircles the sleeve 106 and is interposed between the sleeve and the hub 244 as shown in Figure 15. The frictional linkage trip 243 comprises the plate 192, carried by the hub 244, and a contact arm 246, mounted on the plate for rotation relative thereto and securely fastened to the plate by a rivet 247. A flat leaf spring 248 is inserted between the plate 192 and the contact arm 246. The leaf spring 248 is provided with a flat lateral projecting portion 249 which lies along one side of the contact arm 246, and an oppositely extending flat portion 250 which lies along one side of plate 192. This latter mentioned flat portion 250 is furnished with an end 251 having a female radius substantially equal to that of the hub 244 so as to fit thereagainst and partially circumscribe the hub to prevent rotation of said spring 248 with respect to plate 192. The plate 192 and hence the contact arm 246 is rotated by the tone arm as it follows in the groove of a record. The tone arm is drivably connected to the plate 192 through the arm 117 and vertically extending pin 118 which engages a radially extending notch 252 in the plate 192.

When the tone arm is swung to its most extreme position outside the record circle, as shown in Figures 1 and 4 for example, where the machine is set for manual playing, the contact arm engages a stop 253 mounted on the underside of the platform. As shown in Figure 4, the contact arm 246 is repositioned with respect to the spring 249 each time the tone arm is swung from its innermost position on a record to its outermost position outside the record circle, shown in Figure 1. This repositioning operation of the contact arm with respect to the spring 249 and plate 192 is the same for both 10 and 12 inch records.

As the tone arm follows in the grooves of a record the arm moves toward the center of the turntable, thus rotating the contact arm 246 in a counterclockwise direction as viewed in Figures 4 and 5. The outer end or free end of the contact arm 246 is furnished with an element 254, disposed at right angles to the arm, for engagement with the latch plate 240, for rotating the same in a counterclockwise direction around the rivet 242, see Figure 5. The free end of the tine 237 is likewise equipped with an element 255, disposed at right angles to the tine, for engagement with the cam 239 for rotating the latch plate 240 in a clockwise direction around the rivet 242, see Figure 4. That is, the contact arm imparts counterclockwise rotation to the latch plate 240 and the oscillatable forked lever 235 imparts clockwise rotation to the latch plate. The front end of the latch plate on which the cam 239 is formed is provided with a flat surface 256 against which the element 255 abuts at times when the tone arm has moved into the trip grooves of a record. At this time an increase in angular velocity is imparted to the contact arm which in turn rotates the latch plate in a counterclockwise direction at an increased velocity, thereby causing the element 255, which has periodic movement, to hit the surface 256 instead of the cam 239. This action of the forked lever 235 on the latch plate rotates the reject lever 241 about the screw 177 as a pivot. The length of the lever arm acting about the screw 177 tending to rotate the reject lever is equal to the distance between the centers of the screw 177 and the rivet 242. The latch plate is cut out at 257 so as to form sides 258 and 259 to thereby limit the rotation of the latch plate with respect to the reject lever. This prevents the latch plate from rotating out of the path of travel of said element 255, which is located at the free end of the tine 237. The upper edge of the latch plate extends into the path of movement of the rivet head 183b to thereby rotate the latch plate 240 in a clockwise direction to cause it to assume its original setting, when the machine is cycled, see Figure 5. As shown in Figure 4, the upper edge of the latch plate also abuts the rivet head 183b when the machine is set for manual play so that the flat surface 256 cannot be rotated into the path of element 255. That is, for manual play the element 255 is always swung against the cam surface 239 so as to rotate the latch lever in a clockwise direction about the rivet 242 as a pivot. This renders the automatic trip inoperative.

When the record changer is set for automatic play it will sometimes be desirable to discard a record before the complete reproduction thereof. In order to do this a reject rod 267 is provided, which has one end connected to the end of the reject lever adjacent the spring 260, and the other end of the rod connected to a slidable button 268 mounted on top of the platform. Operation of this reject rod swings the reject lever 241 against the gear sector 154 to thereby engage the pinion gear 45, whereby a record changing cycle is initiated.

The reject lever 241 is normally held out of engagement with the gear sector 154 by a spring 260. The end of the reject lever opposite the spring 260 is formed with an extension 266 which rides against the bolt 183a when the machine is set for manual playing, to preclude cycling the machine during this period. This arrangement renders the reject mechanism inoperative during manual play, see Figure 4. However, when the machine is set for automatic play, of a 10 inch record for example, the extended end 266 will swing clear of the bolt 183a since the projecting finger 187 of the slidable member 182 is now at rest against the hub 190 in the position shown in Figure 5. The end 266 will likewise swing clear of the bolt 183a when the machine is set for automatically playing a 12 inch record.

The action of the trip mechanism is as follows: Assume that the record changing mechanism is set for automatically playing a stack of records top side. See Figures 2 and 5. During the reproduction period the forked lever 235 is oscillating continuously. Also, as the tone arm follows in the grooves of a record the contact arm 246 swings against the latch plate 240 rotating the same about the rivet 242. However, the tine 237 of the continuously oscillating forked lever rides on the cam surface 239 at one end of each period of oscillation to thereby return the plate to its original setting. This action continues until the tone arm follows into the trip grooves of the record, at which time the increased angular velocity of the contact arm 246 rotates the latch plate so that the flat surface 256 is in the path of the oscillatable lever. The engagement of the oscillatable lever with the latch plate in this manner pivots the reject arm 241 in a clockwise direction to thereby urge the sector 154 into meshing relationship with the pinion gear 45.

*Mechanism for reversing the direction of rotation of said driving mechanism*

In the record changer of the present invention the turntable is rotated in one direction for playing the top side of a record and in the opposite direction for playing the bottom side of a record. To accomplish this I provide a control circuit interconnected with a selector switch 270, a reversing toggle switch 271 and the motor 22, see Figure 12. When playing either all top or all bottom sides of a stack of records the selector switch 270 is wired to the motor 22 to cause rotation thereof in the desired direction. At this time, that is, when playing either all top or all bottom sides of a stack of records, the reversing toggle switch 271 is inoperative in the electrical circuit.

When playing alternate sides of a stack of records the selector switch is rotated to the alternate position so that the toggle switch is energized to thereby take over control of the motor. A toggle lever 272 is interposed between the toggle switch 271 and a pair of radially located driving pins 273 and 274, mounted on the interrupted gear 152, see Figures 4, 7, and 8. The toggle lever 272 is formed with a pair of wing members 275 and 276, a head member 277, and a tail member 278, the latter of which is engageable with a bi-pronged lever 279 of the toggle switch.

It is a function of the driving pin 274 to set up the toggle lever 272 at the end of each cycle when playing all top or all bottom sides so that the head member 277 will be positioned in the path of travel of the pin 273. The importance of positioning the toggle lever at the end of each cycle will be demonstrated by way of an example.

Let it be assumed that the machine has finished playing all top sides of a stack of records. At this time the toggle lever 272 will be in the position shown in Figure 4 and the toggle switch will be connected as shown in Figure 12. It will be noted that although the changer has been playing records all top side the toggle switch 271 is positioned for playing the bottom side. The machine is loaded with 10-inch records and the selector switch 270 is now set for alternate play, as designated by dotted lines. Note also that the member 209 has been rotated to the position shown in Figure 7, under the action of switch 270, via the wire connection 213. Tracing the circuit in Figure 12 discloses that the toggle switch is now energized for playing the bottom side of a record, which means that rotation of the drive wheel will be the reverse of what it was when playing the top side of a record. The reject button 268 is now operated to initiate a cycle to thereby deposit a record on the turntable and move the tone arm into position. Rotation of the interrupted gear during the first part of the cycle will be in a counterclockwise direction the same as for bottom play, until the pin 273 rides against the head member 277 thus completing the switching operation started by the pin 274 when it sets up the toggle lever by rotating it partially so that head 277 is in the path of travel of pin 273. This last action of the toggle switch connected the machine for top side play which causes a reversal of the machine. In riding against the member 277 the pin 273 also sets up the toggle lever so that the wing member 275 would be engaged by the pin 273 when the machine was reversed. That is, with the reversal of the machine the interrupted gear 152 now rotates in a clockwise direction so that the pin 273 now abuts the wing 275 thus revolving the toggle lever only enough to reposition the head member 277 for engagement with the pin 273 when the machine is cycled upon reproduction of the top side of the record. The interrupted gear continues in the clockwise direction until the toothless portion of the gear registers with the pinion gear 45, at which time the cycling period of the machine is ended.

The tone arm has now come to rest in the outer grooves on the top side of a 10-inch record. Upon reproduction of the record the trip mechanism will initiate the cycle for transferring the tone arm to the underside of the record.

Since the toggle switch is set for playing top side of a record the initial direction of the interrupted gear will be clockwise until the pin 273 rides across the head member 277. The machine will now reverse, thus rotating the tone arm to a position for playing the bottom side of the record. Attention is called to the fact that upon reversal of the machine the pin 273 rides against the wing member 276 to thereby set up the toggle lever so that the head 277 will be engaged by the pin 273 the next time it rotates around in a counterclockwise position. It should be remembered that the jack knife was caused to collapse by the initial clockwise motion of the gear sector so that the record remained in place while the tone arm went from top to bottom.

Although this invention has been described in connection with certain specific embodiments, the principles are susceptible of numerous other applications that will readily occur to persons skilled in the art.

Having thus described the various features of the invention, what I claim as new and desired to secure by Letters Patent is:

I claim:

1. In a phonograph apparatus, in combination, a turntable for supporting a record during the reproduction of both sides thereof, a tone arm constructed and arranged to follow in the grooves on both sides of said record, means for positioning said tone arm in the grooves on either side of said record, said turntable being provided with a driving connection, a magazine for receiving a reproduced record, means for supporting a stack of records for release to said turntable one at a time upon actuation of said means, means for actuating said first named means, means for supporting said turntable in a first position below said stack of records and in a second position out from under said stack, means engageable with said driving connection when the turntable is in its first position for rotating the same and disengageable therefrom to permit movement of said turntable to its second position, and a mechanism for positioning said turntable in said first and second positions, said second named means including means for supporting a reproduced record for deposit in said magazine upon movement of said turntable to said second position.

2. In a phonograph apparatus, in combination, a turntable for supporting a record during the reproduction thereof, said turntable being equipped with a driving connection, a magazine for receiving a reproduced record, means for supporting a stack of records for release to said turntable, in a preselected manner upon actuation of said means, means for actuating said first named means, means for supporting said turntable in a first position below said stack of records and in a second position out from under said stack, means for rotating said turntable and including a member drivably engageable with said driving connection when the turntable is in its first position and disengageable therefrom to permit movement of said turntable to its second position, and a mechanism for positioning said turntable in said first and second positions, said first named means including means for supporting a reproduced record for deposit in said magazine upon movement of said turntable to said second position.

3. In a phonograph apparatus, in combination, a turntable for supporting a record during the reproduction thereof, said turntable being equipped with a driving connection, a magazine for receiving a reproduced record, means for swingably supporting said turntable in overlying and non-overlying positions with respect to said magazine, means releasably supporting a stack of records above said magazine for release to the turntable one at a time, means for rotating said turntable including a member drivably engageable with said driving connection when the turntable is in a position overlying said magazine and disengageable from said turntable to permit movement thereof to a non-overlying position, a mechanism for positioning said turntable in said overlying and non-overlying positions, and means for supporting a record above the turntable during movement to said non-overlying position and then transferring said record to said magazine therebelow in time relationship to movement of said turntable to a non-overlying position.

References Cited in the file of this patent

UNITED STATES PATENTS

| Number | Name | Date |
|---|---|---|
| 1,302,217 | Raney | Apr. 29, 1919 |
| 1,727,731 | Reade et al. | Sept. 10, 1929 |
| 1,954,246 | Jones | Apr. 10, 1934 |
| 2,068,449 | Downs | Jan. 19, 1937 |
| 2,281,548 | Andrews | May 5, 1942 |
| 2,295,460 | Farrow Jr. | Sept. 8, 1942 |
| 2,299,633 | Knox et al. | Oct. 20, 1942 |
| 2,330,293 | Knox | Sept. 28, 1943 |
| 2,457,668 | Hart | Dec. 28, 1948 |
| 2,458,496 | Andrews | Jan. 11, 1949 |
| 2,506,926 | Johnson | May 9, 1950 |
| 2,509,229 | Hart | May 30, 1950 |
| 2,598,584 | Miller et al. | May 27, 1952 |
| 2,648,541 | Burt | Aug. 11, 1953 |

FOREIGN PATENTS

| Number | Country | Date |
|---|---|---|
| 541,156 | Great Britain | Nov. 14, 1941 |